(No Model.) 4 Sheets—Sheet 4.
J. KEEN, T. R. MARRIOTT & F. COOPER.
VELOCIPEDE DRIVING GEAR.
No. 491,429. Patented Feb. 7, 1893.
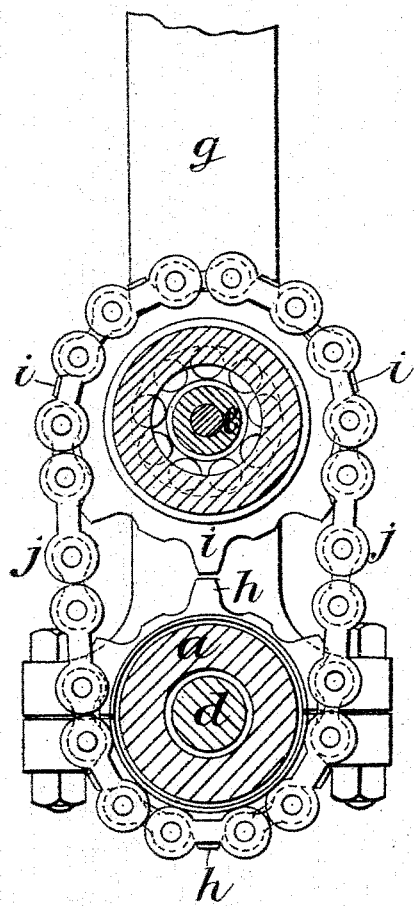
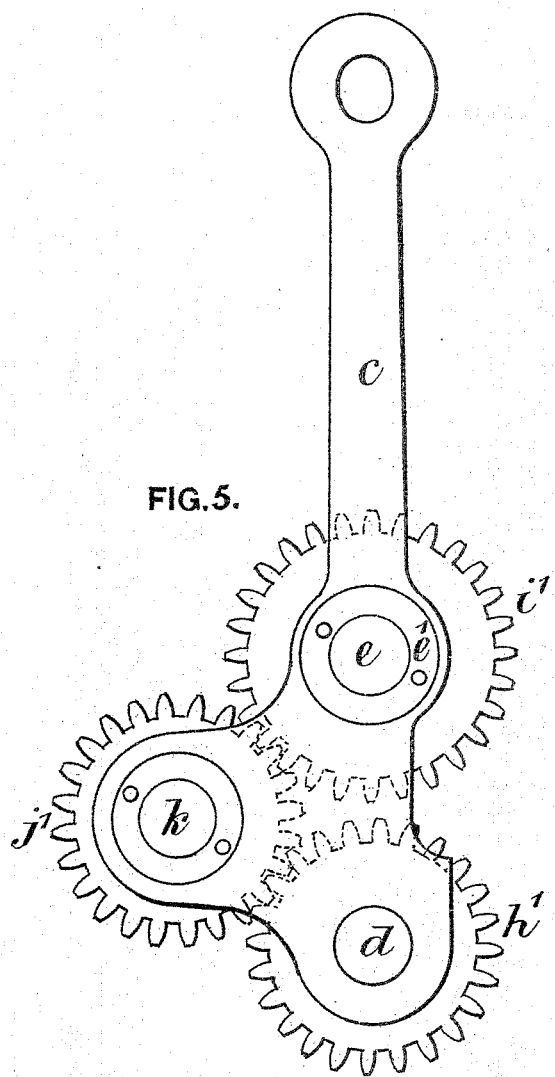
Inventors:
John Keen.
Thomas R. Marriott.
Frederick Cooper.
By Knight Bros.
Attorneys.
Attest:
Geo. E. Cruse.
Harry T. Rohrer.

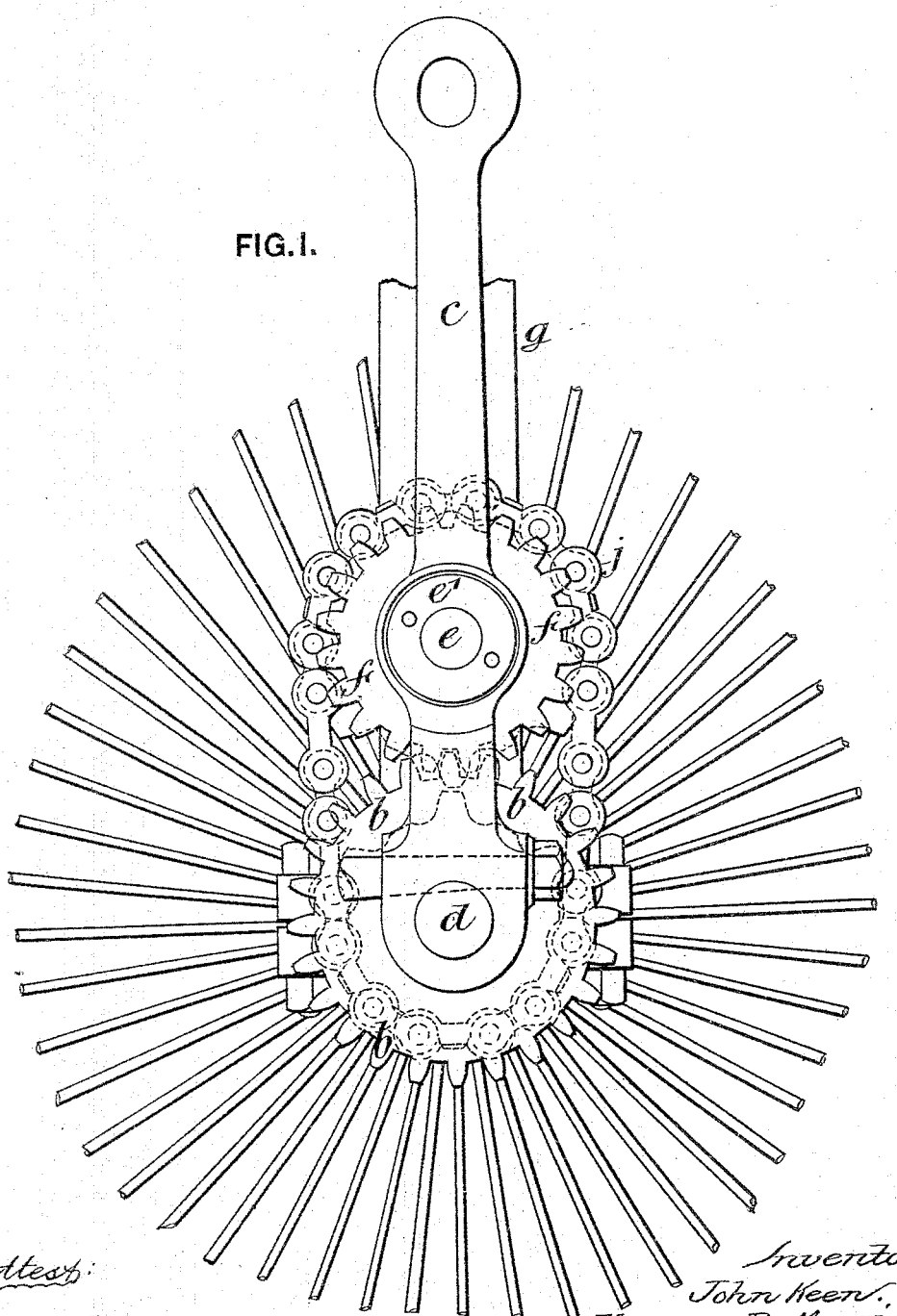

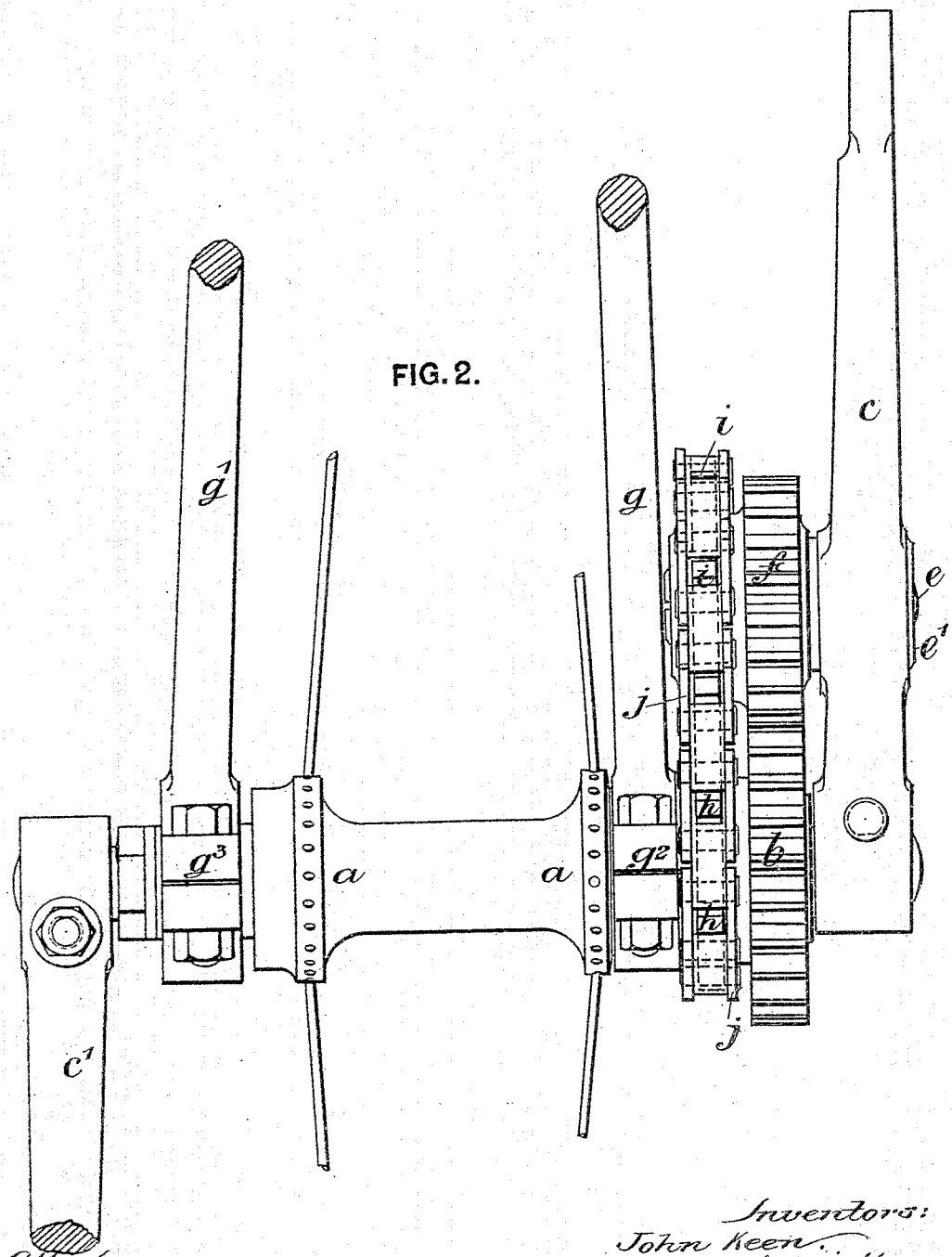

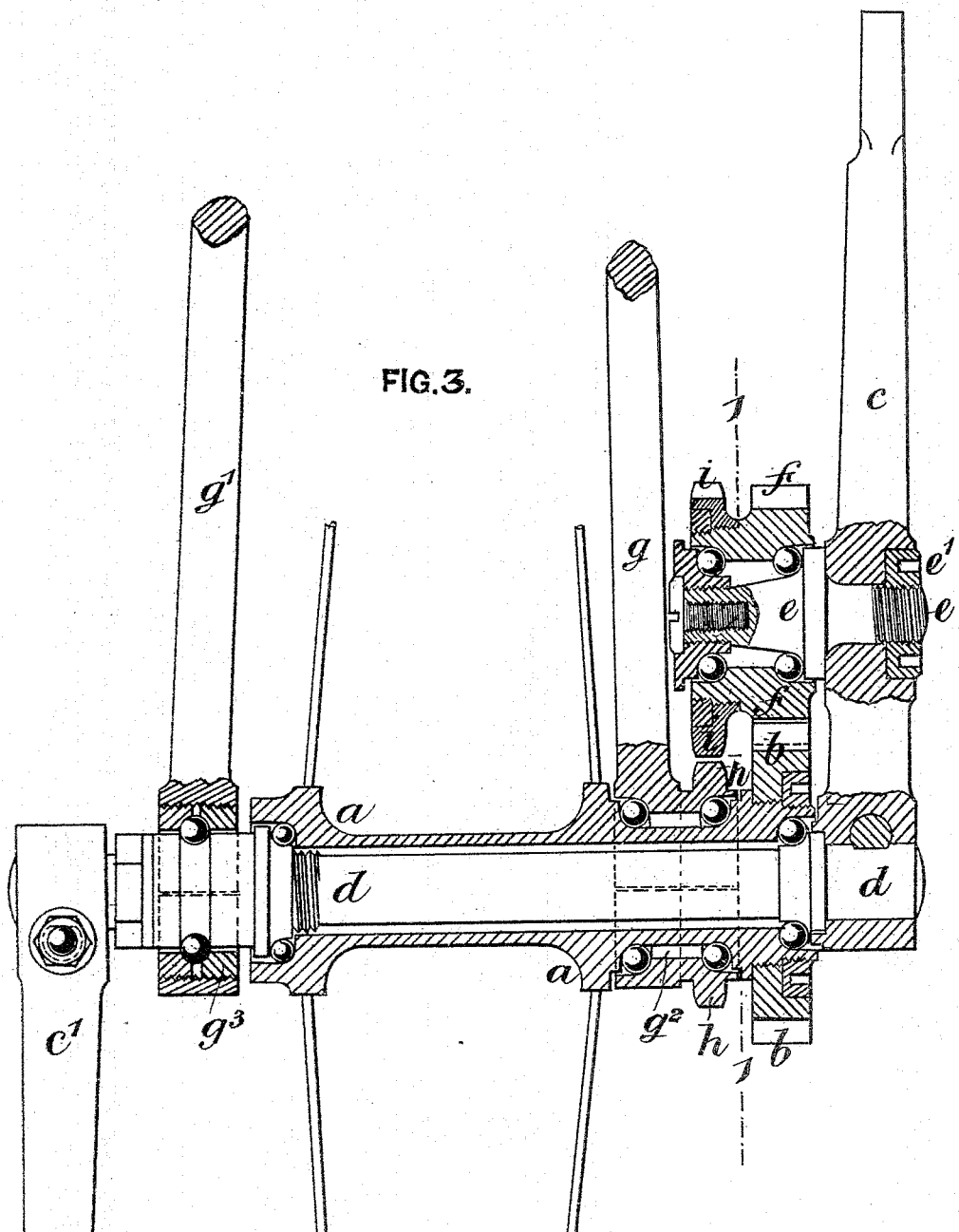

UNITED STATES PATENT OFFICE.

JOHN KEEN, THOMAS RUSHFORTH MARRIOTT, AND FREDERICK COOPER, OF LONDON, ENGLAND.

VELOCIPEDE DRIVING-GEAR.

SPECIFICATION forming part of Letters Patent No. 491,429, dated February 7, 1893.

Application filed February 26, 1892. Serial No. 422,910. (No model.)

*To all whom it may concern:*

Be it known that we, JOHN KEEN, residing at Long Ditton, in the county of Surrey, and THOMAS RUSHFORTH MARRIOTT and FREDERICK COOPER, both of Holborn Viaduct, in the city of London, England, subjects of the Queen of Great Britain, have invented certain new and useful Improvements in Velocipede Driving-Gear, of which the following is a specification.

The object of the present invention is to combine the sun and planet gear with a rotary crank and pedal for the driving gear of velocipedes in a simple and effective manner. And in order that our said invention may be clearly understood and readily carried into effect, we will proceed, aided by the accompanying drawings, fully to describe the same.

In all the figures like parts are indicated by similar letters of reference.

Figure 1 is a side view, and Fig. 2 is an end view, of part of an ordinary bicycle with our improved gear applied thereto. Fig. 3 is a section thereof taken through the center of the hub with the chain removed, and Fig. 4 is a cross section taken on the line 1—1 of Fig. 3. Fig. 5 represents a slight modification.

$a$ is the hub of the driving wheel and $b$ is a toothed wheel fixed rigidly thereto.

$c\ c'$ are the cranks mounted on the opposite ends of an inner spindle $d$, which runs freely through the hub of the driving wheel and is carried in suitable ball bearings. The crank $c$ carries a stud $e$ passed therethrough and provided with a nut $e'$ by which it is held firmly in position. Upon this stud $e$ is loosely mounted a toothed wheel $f$, (the "planet" wheel,) which gears into the toothed wheel $b$ fixed rigidly on the hub of the driving wheel.

$g\ g'$ are the arms of the fork carrying the driving wheel. On the ends of these arms are fixed suitable ball bearings $g^2$ and $g^3$. On the bearing $g^2$ we fix rigidly a chain wheel $h$, and to the toothed wheel, (or "planet" wheel) $f$, on the crank $c$, is fixed another chain wheel $i$. Around these chain wheels $h$ and $i$ is passed a chain $j$, which is held fast by the chain wheel $h$ on the fork bearing $g^2$. When the crank is revolved, the chain $j$ gives rotary motion to the "planet" wheel $f$ through the chain wheel $i$ fixed thereto, and this "planet" wheel $f$, gearing with the toothed wheel $b$ fixed on the hub of the driving wheel $a$, causes the driving wheel to revolve more quickly than the cranks.

In the drawings we have shown the fixed chain wheel $h$ with six teeth and the loose chain wheel $i$ with seven teeth, while the toothed wheels $b$ and $f$ have respectively twenty-four and twenty teeth, but the proportions of the various wheels may be varied according to the gear desired.

The planet wheel $f$ and the chain wheel $i$ are mounted on suitable ball bearings on the stud $e$.

The spindle $d$ is mounted at one end in the ball bearing $g^3$, and at the other end it runs upon balls carried in the interior of the hub $a$.

The hub is mounted at one end in the double ball bearings $g^2$, and the other end upon a row of balls running upon a cone on the spindle $d$.

By this construction of parts we are enabled to obtain very long bearings for the hub and spindle.

The chain wheel $h$ and the bearing $g^2$ are divided horizontally, and each half chain wheel $h$ and half bearing $g^2$ is made in one piece of metal or they are fixed rigidly together, the upper and lower parts being connected together firmly by nuts and bolts, as shown in the drawings.

In Fig. 5 the sun and planet wheels are omitted for the sake of clearness. In this case the chain wheels and chain are replaced by toothed wheels $i'$ and $h'$, and a carrying or intermediate pinion $j'$, mounted upon a stud $k$ carried by an enlargement formed upon the side of the crank, is used for communicating motion from the fixed wheel $h'$ to the wheel $i'$.

We are aware that sun and planet gear has been applied to bicycles in various forms and we therefore do not claim the same broadly.

What we claim, and desire to secure by Letters Patent, is:—

1. In velocipede driving gear, the combination of the fork bearings, the hub of the driving wheel journaled in one of them, the crank spindle journaled in the hub and in the other fork-bearing, a sun-wheel fixed on the hub, a planet-wheel on the crank meshing with the sun-wheel, a wheel fixed rigidly to the fork-bearing, a wheel fixed to the planet-wheel, and means for communicating motion to the planet-wheel, through the medium of said rigid wheel, substantially as described.

2. In velocipede driving gear, the combination of the fork-bearings, the hub of the driving-wheel journaled in one of them, the crank-spindle journaled in the hub and in the other fork-bearing, a sun-wheel fixed on the hub, a planet-wheel on the crank meshing with the sun-wheel, a wheel fixed rigidly to the fork-bearing, a wheel fixed to the planet-wheel, and a chain passing around the wheels fixed to the fork-bearing and planet-wheel, whereby when the cranks are turned, the chain revolves the planet-wheel and its attached-wheel, and through said planet-wheel revolves the sun-wheel and the driving-wheel at a greater rate of speed than the cranks, substantially as described.

JOHN KEEN.
THOMAS RUSHFORTH MARRIOTT.
FREDERICK COOPER.

Witnesses:
B. J. B. MILLS,
CLAUDE K. MILLS,
23 *Southampton Buildings, London, W. C.,*
*Patent Agents.*